United States Patent

Weick et al.

[15] 3,673,796
[45] July 4, 1972

[54] ANTICIPATING AIR INJECTION SYSTEM FOR TURBOCHARGED ENGINES

[72] Inventors: Louis F. Weick, Washington; William F. Linne, Peoria, both of Ill.

[73] Assignee: Caterpillar Tractor Co., Peoria, Ill.

[22] Filed: March 3, 1970

[21] Appl. No.: 16,133

[52] U.S. Cl. ............................................60/13, 123/119 CE
[51] Int. Cl. .............................................................F02b 37/04
[58] Field of Search ....................60/13; 417/34; 123/119 CE

[56] References Cited

UNITED STATES PATENTS

| | | |
|---|---|---|
| 3,174,275 | 3/1965 | Collin.................................123/119 C |
| 3,007,626 | 11/1961 | Simson.....................................417/34 |
| 3,303,348 | 2/1967 | Cox et al............................123/119 CE |
| 3,396,533 | 8/1968 | Fischer........................................60/13 |
| 3,173,242 | 3/1965 | Erickson......................................60/13 |

Primary Examiner—Carlton R. Croyle
Assistant Examiner—Warren Olsen
Attorney—Fryer, Tjensvold, Feix, Phillips & Lempio

[57] ABSTRACT

An air injection system for turbocharged engines wherein air is released from a container and injected into the engine manifold in response to a signal representing a change in the magnitude of the load driven by the engine includes a valve means for isolating the turbocharger from the manifold during the time the air is injected and until the pressure in the manifold falls below the turbocharger discharge pressure during which time the turbocharger increases its speed whereby engine speed deviations are minimized.

6 Claims, 4 Drawing Figures

INVENTORS
LOUIS F. WEICK
WILLIAM F. LINNE

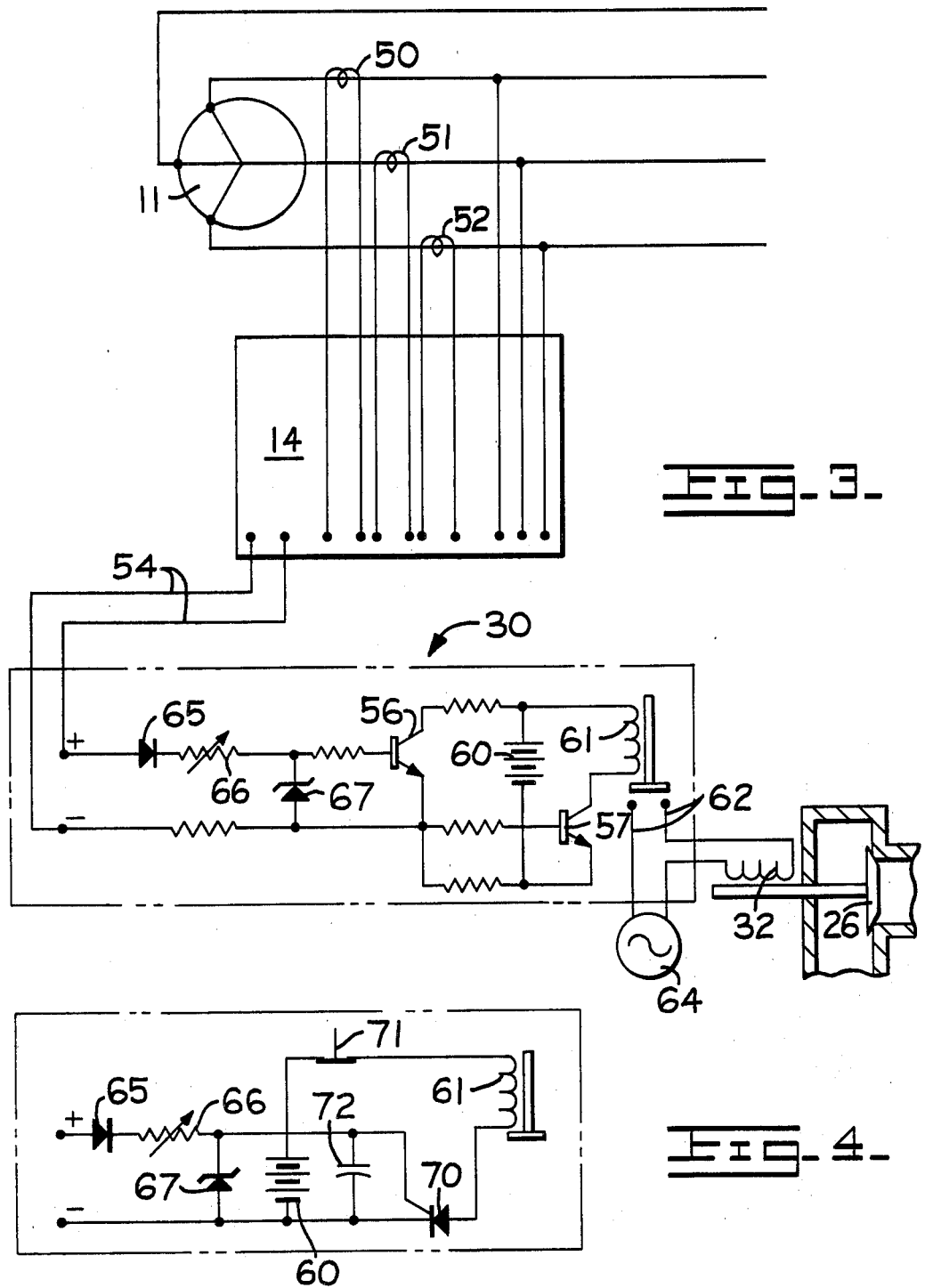

3,673,796

ANTICIPATING AIR INJECTION SYSTEM FOR TURBOCHARGED ENGINES

BACKGROUND OF THE INVENTION

In many installations where a turbocharged internal combustion engine, such as a diesel engine, is used to supply a varying load, systems may be incorporated to supply supplementary air during load changes to prevent wide variations in engine speed. These systems are particularly important where the engine is used to drive a generator or alternator supplying an electrical load to avoid voltage or frequency changes as the electrical load varies. The increasing of the fuel supplied to the engine in response to an increase in load is not always satisfactory since supplementary air must be available to produce proper combustion with increased fuel supply. As a result, in turbocharged engines there is often a substantial lag between the time the fuel is increased and a corresponding increase in air from the turbocharger due to the interval necessary to increase turbocharger output. External supplementary air can be injected into the intake manifold of the engine to produce a proper fuel air mixture within the combustion chamber to reduce engine speed variation when load increases; however such prior art systems all have a substantial lag or response time between the sensing of the increase load on the engine and the actual increase of fuel flow and the injection of air to the engine.

Typical prior art systems are shown in U.S. Pat. No. 3,020,901 issued to Cook, U.S. Pat. No. 3,190,068 issued to Williams et al., and U.S. Pat. No. 3,007,626 issued to Simson.

It has often been the practice in these prior systems to provide some form of a switching arrangement responsive to the manifold pressure or fuel flow to inject air from an external independent source into the intake manifold. Other switching arrangements are responsive to changes in the speed of the engine which is normally used to set the fuel pump rack to control the injection of fuel and also may control the injection of air from the container into the intake manifold.

In each of these cases, a variation in load on the engine has caused a change in the operating characteristics of the engine which is then sensed and employed to correct these operating characteristics which result in long response periods between a change and its correction.

While the above systems are a satisfactory systems where engine speed variations are not critical, there are certain types of installations which require a very minimum of response time to limit variations in engine speed. Typical of the latter type of installations are engine driven alternators that require substantially constant frequency or voltage output in the electrical power being supplied by them. If the voltage and frequency must remain constant, speed variations in the engine before, during or after the increase in the fuel flow and injection or air are to be avoided or minimized.

The present invention solves the above problems of time lag or response between the time that an increase load on the engine occurs and the time when air is injected into the manifold by sensing changes in the load directly before it has changed the operating characteristics of the engine. This makes the invention particularly suitable for turbocharged diesels driving alternators or the like and requires sensing the load carried by the engine to control the injection of air through converting it to an electrical control signal which can be used to control the injection of air to the manifold. In those cases where the load sensing circuit supplied an electrical signal for actuating the governor on the engine, this electrical signal may also be used as a control signal for the fuel injection. The control signal is used to actuate a switching circuit which in turn controls the operation of a valve disposed to control the flow of air from a source or container to the intake manifold.

Since the air injection supply is limited, a flapper valve disposed in the connection between the turbocharger and the intake manifold is employed to temporarily unload the turbocharger. As air is injected to prevent a change in the operating speed of the engine, the increased manifold pressure will close the flapper valve, preventing the air injected into the manifold from flowing to the turbocharger. As the engine responds to the increased fuel flow and air supply, it drives the turbocharger faster allowing discharge pressure of the turbocharger to increase. When the discharge pressure of the supercharger exceeds pressure of the injected air in the manifold, the flapper valve will open and the normal turbocharging of the engine will resume at a level that can accommodate the increased load. The closing of the flapper valve when the air is injected unloads the turbocharger allowing it to accelerate under the no load condition. This permits the turbocharger to respond rapidly under the influence of increased exhaust pressures to a speed suitable for maintaining the engine speed when the injection air is stopped.

SUMMARY OF THE INVENTION

The instant invention involves the combination of a turbocharged engine having an intake manifold that is connected to a variable load requiring essentially a constant driving speed and an anticipating engine speed control speed which includes sensing means associated with the variable load which is operable to detect load variation before engine speed changes occur, a source of pressurized air connected to the engine intake manifold, a controlable valve means between the source of pressurized air and its connection to the intake manifold, a pressure actuated flapper valve connected between the intake manifold and the engine turbocharger and a switching circuit coupled to the sensing means and the controlable valve means whereby pressurized air is introduced into the intake manifold to prevent engine speed changes as the load thereon increases. The sensing means also may be connected to the fuel control system of the engine so that additional fuel flow is available simultaneously with the injection of pressurized air. The flapper valve closes when the pressurized air is injected so that the turbocharger is unloaded enabling it to accelerate to a higher speed for increased horsepower output prior to the reopening of flapper valve.

BRIEF DESCRIPTION OF THE DRAWINGS

The present invention will be more easily understood from the following detailed description of a preferred embodiment in conjunction with the attached drawings, in which:

FIG. 3 is a schematic drawing of one form of control circuit for the air injection system; and, FIG. 4 is a modified form of a control circuit.

DESCRIPTION OF A PREFERRED EMBODIMENT

Figure 1:
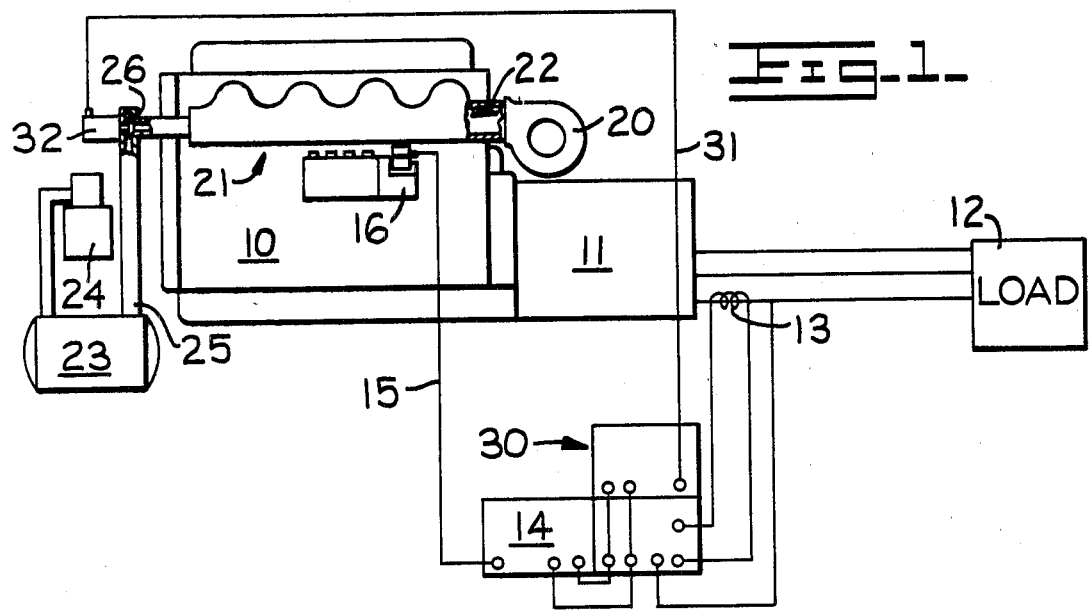
FIG. 1 is a schematic drawing of an engine generator unit with the anticipating air injection system of this invention installed thereon.

Referring to FIG. 1, a schematic arrangement of an engine generator combination is shown including the air injection system of the present invention. The engine 10 may be any type of internal combustion engine utilizing a turbocharger, such as turbocharged diesel engine. It is coupled to a generator or alternator 11 that supplies an electrical load 12 (such as a radar installation). The magnitude of the electrical load is sensed by any desired means, such as a current transformer 13, and the output signal is supplied to a load sensing and speed control system 14. The control system 14 is designed to regulate the speed of the engine very accurately to maintain a desired frequency or voltage output from the alternator. A signal from the control circuit 14 is supplied over a lead 15 to an actuator 16 that cooperatively adjusts the rack on fuel pump of the engine in combination with a conventional governor system. The system can be any well known type and in addition to the load signal receives additional signals including the engine speed to maintain the desired engine speed with changing loads. For example, a commercially available Woodward electrical governor system can add the electrical signals for positioning the engine fuel control for both r.p.m. and changes in loading.

The engine is equipped with a turbocharger 20 which discharges into the intake manifold 21 of the engine. A flapper type check valve 22 is disposed in the connection between the turbocharger and the intake manifold to control reverse flow from the manifold to the turbocharger as explained below. On the left of the engine there is shown a container 23 of compressed air (pressurized air supply) that is connected to the intake manifold by means of a conduit 25. An external air source in the form of a compressor 24, is used to charge the container. A control valve 26 is disposed in the conduit 25 to control the flow of air from the container 23 to the intake manifold. The flow through the control valve is regulated by a switching circuit 30 which is coupled to the load sensing and speed control circuit 14. This switching circuit responds immediately to increases in the load level and opens the valve 26 to inject air into the manifold to prevent the r.p.m. of the engine from decreasing due to a sudden increase in horsepower demand thereon. A signal on lead 31 supplies power to a solenoid 32 arranged to open the control valve when the system demands an increase in horsepower.

From the above brief description, it is seen that the anticipating air injection system of the present invention is responsive to the changes in actual load on the engine prior to the occurance of a change in engine r.p.m. This is accomplished by utilizing the signal from the load sensing and speed control circuit 14 to open the control valve 26 to inject air into the manifold 21 before engine r.p.m. drops. Thus, the air is injected into the manifold substantially at the same time that an increased horsepower demand on the engine occurs. The air can also be injected immediately prior to the increasing of the governor setting of the fuel control system 16 so that sufficient air will be available to the engine when the fuel flow is increased. The supply of the compressed air to the engine is continued until the load level on the engine falls below the threshold level of the switching circuit 30 or the pressure in the container falls below the discharge pressure of the turbocharger which, of course, is unloaded when the flapper valve closes and accelerates so it will be capable of sustaining the increased horsepower output when the flapper valve opens.

Figure 2:
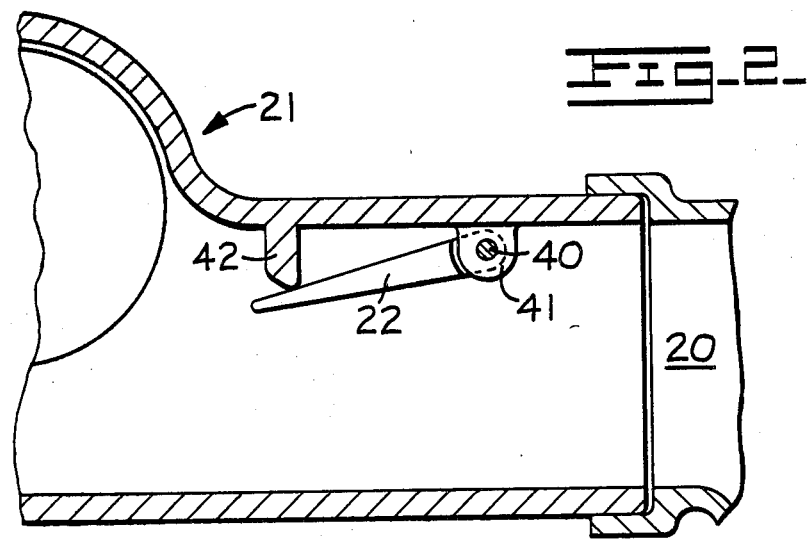
FIG. 2 is an enlarged view of the flapper valve illustrated in FIG. 1.

Referring to FIG. 2, there is shown an enlarged cross-sectional view of the flapper check valve 22, which is pivoted about a pin 40 which is supported by ears 41 that project from the wall of the intake manifold. A stop or limit 42 also projects from the wall of the intake manifold and prevents the flapper valve from opening to a position where it would not respond properly to reverse air flow that causes it to close. Where the intake manifold is substantially circular in cross section, the flapper 22 has a similar circular shape.

In FIG. 3 a schematic of one switching circuit is shown for controlling the opening of the control valve in the air injection system. The actual load supplied by the alternator is monitored by means of current transformers 50–52, and the output signals from the current transformers are supplies to the load sensing and speed control circuit 14.

This output signal from the current transformers is normally in the form of a voltage signal and is supplied by leads 54 to a control switching circuit 30. The control switching circuit is formed by two transistors 56 and 57 which are arranged to connect a battery 60 to a relay coil 61 that causes current to flow through the relay coil to close the relay contacts 62. More particularly, the transistor 56 is coupled to the voltage output signal from the loading sensing circuit through a diode 65 and a potentiometer 66, insures that only direct current will be supplied to the transistor. The threshold level of this transistor can be controlled by the potentiometer. When the transistor 56 conducts, it will cause the battery 60 to energize the relay coil 61 so current will flow through the circuit when the transistor 57 conducts to complete the circuit. This occurs when the output voltage from the transistor 56 raises above the threshold level of the transistor 57 so it will conduct to complete the circuit. When this circuit is completed, at this time the contacts will then close to couple the alternating voltage supply 64 to the solenoid coil 32 and open the control valve 26.

From the above description it can be appreciated that the switching circuit 30 includes both a means for switching an alternating current power supply to energize the solenoid of the control valve, as well as a means to control the threshold level at which the circuit operates. Operating as a trigger circuit, this permits one to vary the load level at which the air injection system will operate to inject air into the engine manifold. The switching circuit also includes a protective Zener diode 65, which is coupled between the base and the emitter of the transistor 56 to prevent the voltage level across this transistor rising above its maximum permissible voltage level.

Referring to FIG. 4, there is shown a modified switching circuit which utilizes a silicon controlled rectifier (referred to as an SCR) in place of the two transistors. The circuit of FIG. 4 uses several of the components shown in FIG. 3 and the description of these will not be repeated. The SCR 70 is disposed so that its control electrode (gate) 73 will be energized or actuated by the voltage signal received from the load sensing circuit. As explained above, a potentiometer 66 is disposed in this circuit so that the threshold level at which the switching circuit operates can be varied. When the threshold level of the signal rises above the value required for triggering the SCR, the SCR 70 will trigger and complete the circuit from the battery 60 through the relay coil 61. This will cause the relay coil to close its associated contacts and energize the solenoid of the air injection control valve.

Since SCR's will conduct until the voltage level across the SCR falls below a threshold value, some means must be provided for resetting the circuit shown in FIG. 4. As shown, this includes a reset switch 71 which can be opened to remove the battery 60 from the circuit and thus extinguish or shut off the conduction of the SCR. A capacitor 72 is placed across the control electrode and ground of the SCR to remove the possibility of a pulse being generated when the reset switch 71 is actuated.

The circuit of FIG. 4 operates in substantially the same manner as that shown in FIG. 3 except that the SCR replaces the two transistors shown in FIG. 3. Also, of course, the circuit of FIG. 4 must include a reset means so that the SCR can be reset. It is possible to eliminate the reset means if an alternating or AC voltage source is substituted for the battery 60. If an AC source was substituted the SCR would extinguish or stop conducting if the voltage on its gate drops below its trigger level.

In an installation requiring electrical power with minimum frequency deviation, the electrical loading changed from 300 to 830kw at 60 Hz. Employing a V–16 turbocharged engine driving an alternator, 3.5 seconds elapsed before the frequency stabilized with a 3 Hz deviation occurring when the invention was not employed.

On this same installation equipped with the current invention and employing a container having a volume of 10 ½ cubic feet charged to 90 p.s.i. which was connected to the intake manifold through valve 26 when the load was increased from 300 to 830kw, 0.55 seconds elapsed before the frequency stabilized with a 1.2 Hz deviation occurring.

The displacement of the engine was approximately 900 cubic inches and the discharge time of the container of the new manifold pressure was approximately 1–2 seconds, with poppet valves employed in the intake manifold to limit the maximum pressure. After the electrical load reduces to 300kw, valve 26 is closed and the container is recharged to 90 p.s.i. so it can recycle.

It should be appreciated that no further air injection will occur once the container and manifold pressurizer equalize with valve 26 open.

What is claimed is:

1. In combination with a turbocharged engine having an intake manifold and a fuel control system which drives a variable load requiring essentially a constant driving speed, and anticipating engine speed control system comprising:

sensing means associated with said variable load and operable to produce a signal proportional to its detected load variations in said variable load prior to the occurrence of speed changes in said turbocharged engine that normally would result from increased horsepower loading thereon;

a tank of pressurized air connected to said intake manifold of said turbocharged engine and maintained at a predetermined pressure:

means to maintain the pressure in said tank of pressurized air;

controllable valve means between said source of pressurized air and its connection to said intake manifold to control the flow of said pressurized air therebetween;

a pressure actuated flapper valve between said intake manifold and its turbocharger; and circuit means coupled to said sensing means and to said controllable valve means whereby said valve means is actuated to temporarily supply a single continuous pulse of said pressurized air to said intake manifold causing temporary closing of said flapper valve when engine horsepower output is required to be increased to minimize speed variations in said turbocharged engine because of increased loading thereon by temporarily unloading said turbocharger.

2. The combination defined in claim 1 wherein the sensing means is connected to the fuel control system of the turbocharged engine to immediately increase fuel flow to said turbocharged engine when the pressurized air is injected into the intake manifold.

3. The combination defined in claim 2 wherein the variable load requiring a constant speed is an alternator and the sensing means monitors the electrical load on said alternator.

4. The combination defined in claim 3 wherein the sensing means includes at least one current transformer.

5. The combination defined in claim 3 wherein said intake manifold includes a relief valve limiting the maximum pressure therein.

6. The combination defined in claim 3 wherein the circuit means includes a switching circuit operable to actuate the control valve means at a preselected level of increased horsepower demand on the turbocharged engine.

* * * * *